(12) United States Patent
Moscoso Gómez

(10) Patent No.: US 7,712,821 B2
(45) Date of Patent: May 11, 2010

(54) SYSTEM FOR REDUCING FUEL CONSUMPTION IN VEHICLES

(76) Inventor: Joaquin Moscoso Gómez, Acequia Real del Jucar, Nave 4, E-46460 Silla (Valencia) (ES)

( * ) Notice: Subject to any disclaimer, the term of this patent is extended or adjusted under 35 U.S.C. 154(b) by 0 days.

(21) Appl. No.: 11/885,627

(22) PCT Filed: Mar. 1, 2006

(86) PCT No.: PCT/ES2006/000098

§ 371 (c)(1),
(2), (4) Date: Jun. 2, 2008

(87) PCT Pub. No.: WO2006/092459

PCT Pub. Date: Sep. 8, 2006

(65) Prior Publication Data

US 2009/0096248 A1 Apr. 16, 2009

(30) Foreign Application Priority Data

Mar. 1, 2005 (ES) ................................. 200500465

(51) Int. Cl.
*B62D 35/00* (2006.01)
(52) U.S. Cl. .................. 296/180.1; 296/180.4
(58) Field of Classification Search ............. 296/180.1, 296/180.4, 91, 181.5; 180/903
See application file for complete search history.

(56) References Cited

U.S. PATENT DOCUMENTS

| 1,584,275 | A |   | 5/1926  | Chalkley |            |
|-----------|---|---|---------|----------|------------|
| 3,010,754 | A |   | 11/1961 | Shumaker |            |
| 3,276,811 | A |   | 10/1966 | Schmidt  |            |
| 3,807,787 | A | * | 4/1974  | Gotz     | ... 296/91 |
| 3,960,402 | A | * | 6/1976  | Keck     | ... 296/180.4 |
| 3,999,797 | A | * | 12/1976 | Kirsch et al. | ... 296/180.4 |
| 4,309,053 | A | * | 1/1982  | Lett     | ... 296/180.4 |

(Continued)

FOREIGN PATENT DOCUMENTS

ES 219464 10/1976

(Continued)

OTHER PUBLICATIONS

International Search Report issued Jul. 6, 2006 in the International (PCT) Application of which the present application is the U.S. National Stage.

*Primary Examiner*—Glenn Dayoan
*Assistant Examiner*—Gregory Blankenship
(74) *Attorney, Agent, or Firm*—Wenderoth, Lind & Ponack L.L.P.

(57) ABSTRACT

The invention relates to a system for reducing fuel consumption in vehicles. According to the invention, fuel consumption is reduced by minimizing the aerodynamic resistances generated as the vehicle moves forward. The inventive system conveys air to the rear or stern of the vehicle where a depression is known to form. In a preferred embodiment of the invention, the air is conveyed using a tubular casing which is fixed to the rear part of the vehicle roof and which bends slightly towards the rear end. The air is channeled from the upper part of the forward-moving vehicle and is released at the low-pressure stern area, the depression serving as a suction device which facilitates the passage of the air. The outlet is oriented towards, but does not extend to the top of the rear doors.

2 Claims, 6 Drawing Sheets

U.S. PATENT DOCUMENTS

| | | | | |
|---|---|---|---|---|
| 4,316,630 A | | 2/1982 | Evans | |
| 4,320,920 A | * | 3/1982 | Goudey | 296/180.4 |
| 5,171,057 A | * | 12/1992 | Sharp | 296/180.4 |
| 5,199,762 A | * | 4/1993 | Scheele et al. | 296/180.1 |
| 5,280,990 A | * | 1/1994 | Rinard | 296/180.1 |
| 5,382,070 A | * | 1/1995 | Turner | 296/180.1 |
| 5,542,737 A | * | 8/1996 | Madden | 296/180.1 |
| 5,842,734 A | * | 12/1998 | Lechner | 296/180.1 |
| 6,224,135 B1 | * | 5/2001 | Rehkopf | 296/91 |
| 6,297,486 B1 | * | 10/2001 | Rom et al. | 244/3.3 |
| 6,685,256 B1 | * | 2/2004 | Shermer | 296/180.4 |
| 6,779,834 B1 | * | 8/2004 | Keller | 296/180.4 |
| 6,877,793 B2 | * | 4/2005 | Cory | 296/180.1 |
| 7,165,804 B2 | * | 1/2007 | Shahbazi | 296/180.1 |
| 7,185,944 B2 | * | 3/2007 | Shahbazi | 296/180.1 |
| 7,216,923 B2 | * | 5/2007 | Wong et al. | 296/180.2 |
| 7,240,958 B2 | * | 7/2007 | Skopic | 296/180.1 |
| 2007/0013209 A1 | * | 1/2007 | Neuburger et al. | 296/180.4 |
| 2007/0024087 A1 | * | 2/2007 | Skopic | 296/180.4 |

FOREIGN PATENT DOCUMENTS

ES            233933        4/1978

* cited by examiner

SYSTEM FOR REDUCING FUEL CONSUMPTION IN VEHICLES

BACKGROUND OF THE INVENTION

I. Field of Invention

The present invention relates to a system for reducing fuel consumption in vehicles, which includes a new process for achieving the purpose being sought, by the reduction of aerodynamic resistance at the depression that is caused in the rear part of the vehicle in its movement forward.

The basic operating principle lies in the fact of collecting air from the surroundings of the vehicle and adequately channeling it to the desired area, in the rear part, in order to counteract the depression created during movement.

II. Description of Related Art

Systems for reducing fuel consumption in vehicles are basically devised to minimize the aerodynamic resistance that is imparted on the front surfaces during the forward movement of the vehicle, offering noteworthy resistance to the air flow. Therefore, the rear and the front of the vehicle are occupied and there are basically deflectors that are placed on the casing, as well as side and bottom flaps placed thereon. The results that are obtained are noteworthy since about 10% of the fuel is saved, as long as the system is used adequately.

Other methods currently existing to reduce fuel consumption include a dismountable body that takes up a large part of the space where the depression is formed and that can be placed on the rear of the vehicle. These methods have several serious inconveniences, among which are:

They are weak, fragile and not very secure.
They are hardly efficient in the terms of saving fuel (<4%).
They are extremely difficult to put in place or replace.
They extremely hamper the opening of the rear doors and the work of the truck driver. It is necessary to dismount the device in order to open the doors.
They are not fixed systems.

Systems that place flaps in the side of the vehicle or the body or trailers are also known for the same purpose, but they also have the inconvenience of being fragile, easy to break and not very secure.

SUMMARY OF THE INVENTION

In general, the present invention is a system to reduce fuel consumption in vehicles. This object is achieved by the reduction of aerodynamic resistance and thus reduces fuel consumption, causing the air in the rear part of the vehicle where the pressure caused in forward motion is produced.

This air supply is achieved by a device placed on the top, in the rear part and surrounding the top edge of the rear part of the vehicle, without achieving or reaching the level of the door. This device is formed by a tubular casing that channels the air that is absorbed by the mouth or front part and expels it towards the low pressure area at the rear.

The outlet faces downward and the inlet has a smaller section than the outlet in order to prevent high pressure.

Some rigidization ribs placed longitudinally and uniformly distributed along the width of the vehicle have also been provided. In order to prevent pressure differences in the tubular casing as formed, the cited ribs include holes or openings to balance the pressures.

Advantages of the system of the present invention include:
Reduction of aerodynamic resistance,
Thus, reduction of fuel consumption,
Simplicity of the structure thereof,
Easy installation and replacement,
Other systems for reducing fuel consumption may be combined with the present system,
Countless versions, adaptations on the use and characteristics of the vehicle, such as where the system is installed,
The system does not hamper the opening of the rear doors or the truck driver's operations,
The system is a solid, reliable, robust and efficient system, and
It is not necessary to dismount or modify the system's structure in order to open the door, since it is a permanently fixed system.

BRIEF DESCRIPTION OF THE DRAWINGS

In order to understand the characteristics of the invention and forming an integral part of this specification, drawings in whose figures the following has been represented in an illustrative and non-restrictive manner are accompanied.

DETAILED DESCRIPTION OF THE INVENTION

Figure 1:
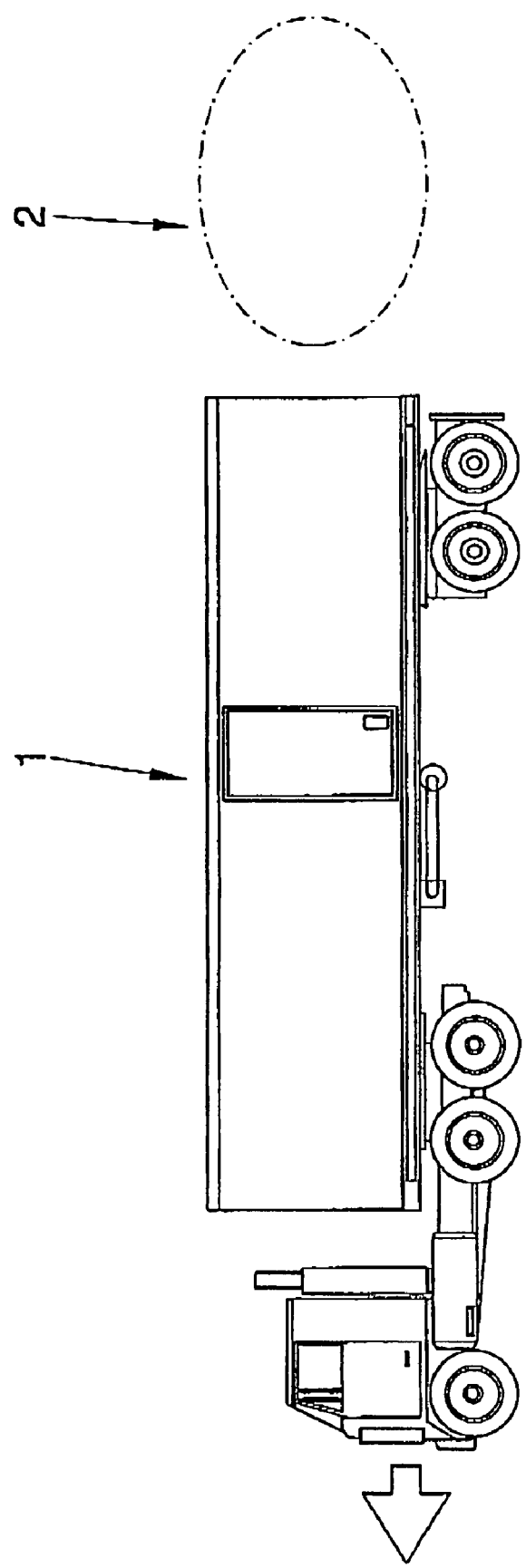
FIG. 1 is a raised schematic longitudinal view that shows a moving vehicle and the depression area that is formed behind it.

With reference to the numbering used in the figures and specifically in relation to FIG. 1, a vehicle (1) is shown that moves forward in the direction shown by the arrow and that causes a depression area in its rear area. The depression area is generally referred to as number (2).

Figure 2:
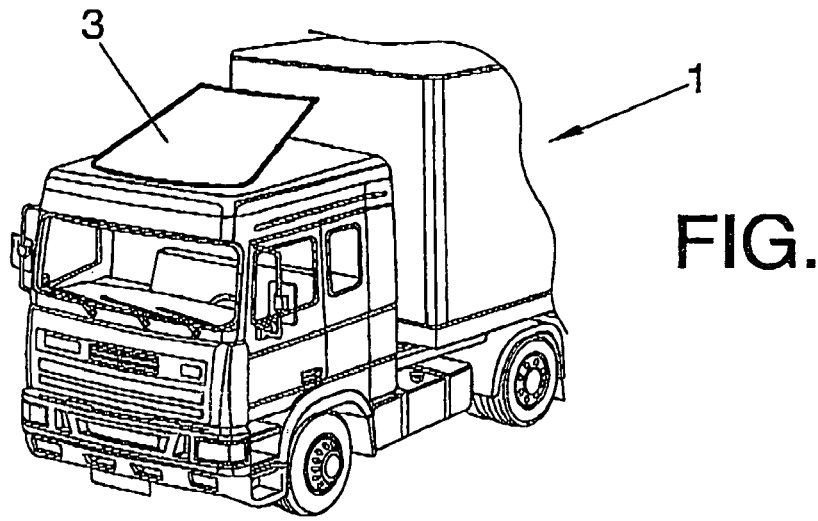
FIGS. 2, 3 and 4 are respective perspective views that show different normal ways to reduce aerodynamic resistance in the front part of the vehicle.
Figure 3:
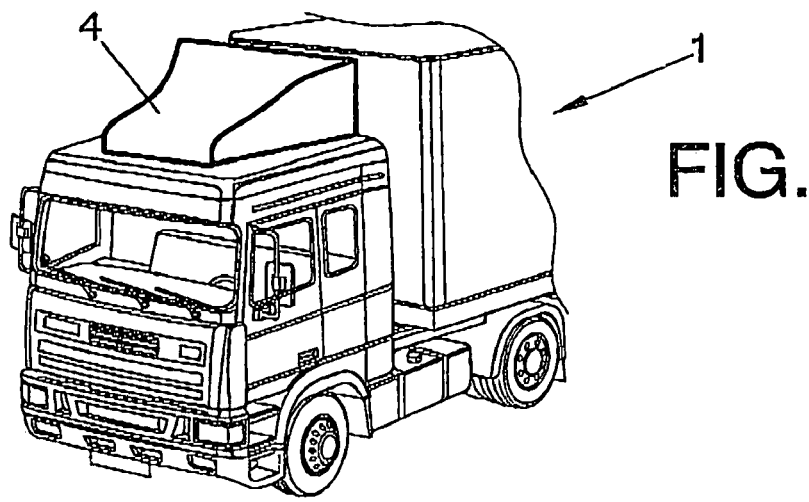
Figure 4:
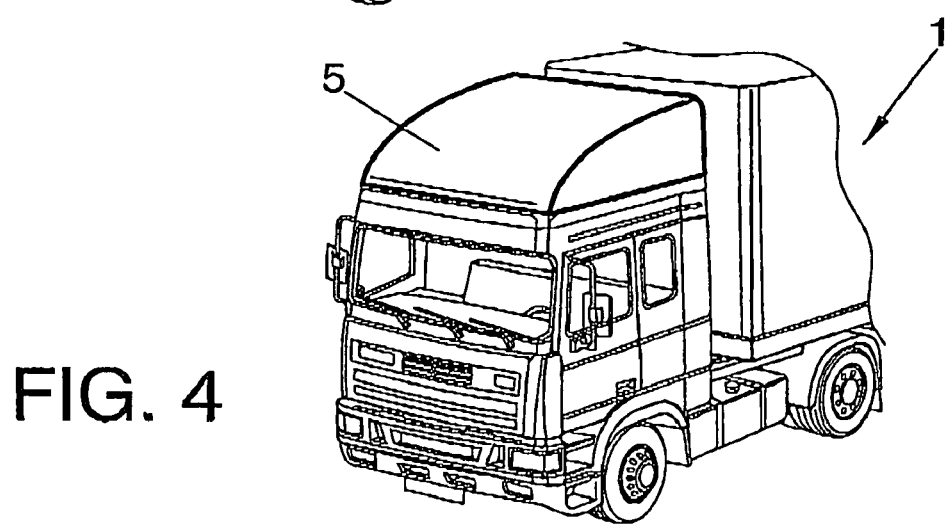

FIGS. 2 to 4 show some of the current systems to reduce fuel consumption in vehicles, adding in the top part of the body some deflectors that deflect the air to reduce the front surface of aerodynamic resistance. FIG. 2 shows an oblique screen (3) that carries out this task; FIG. 3 shows a body (4) that deviates the air and FIG. 4 shows more clearly the mounting of an aerodynamic frame (5).

Figure 5:
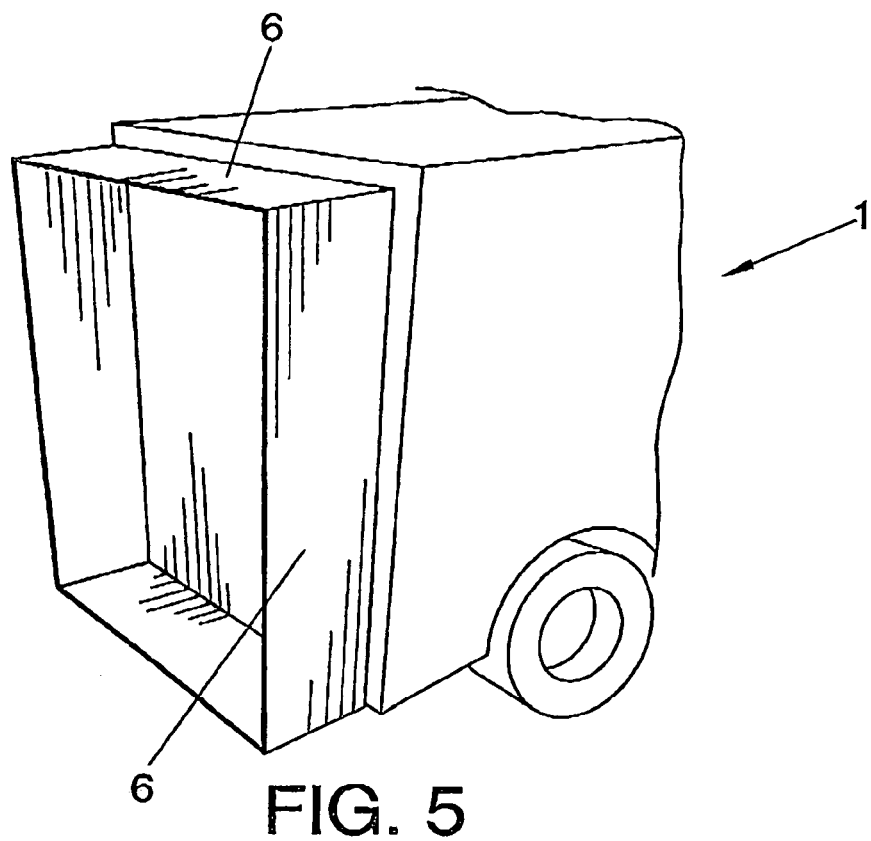
FIG. 5 is a partial and perspective view of the rear part of the vehicle, the stern wall of the rear part including plates to reduce the aerodynamic resistance.

In connection with FIG. 5, as an example, a system that places plates (6) arranged perpendicularly to the walls of the rear of the vehicle is shown, such as only placing two plates (6), or even three, in order not to close the rectangular perimeter.

Figure 6:
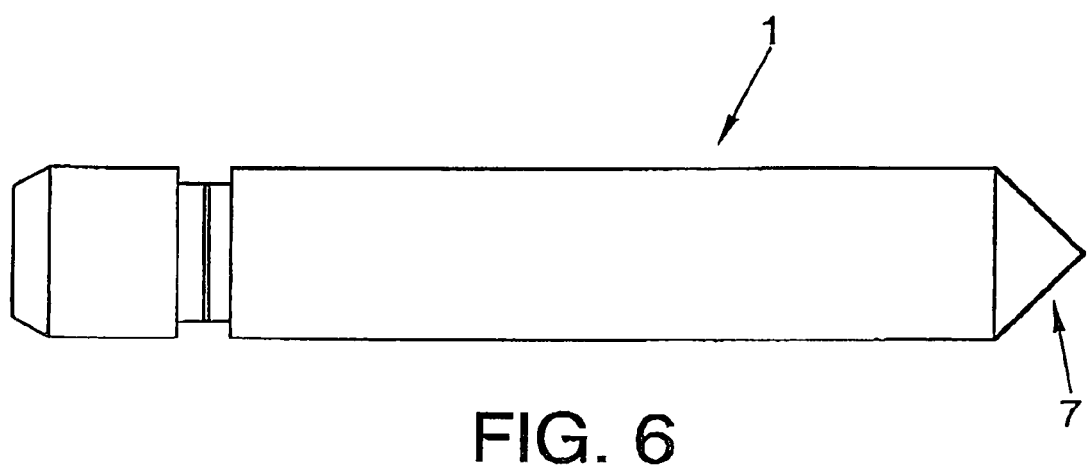
FIGS. 6 and 7 are respective plan and raised longitudinal views of a vehicle with a rear part having a pyramid for the purpose of reducing aerodynamic resistance and precisely to avoid turbulence in the rear part during the forward movement of the vehicle, according to an embodiment.
Figure 7:
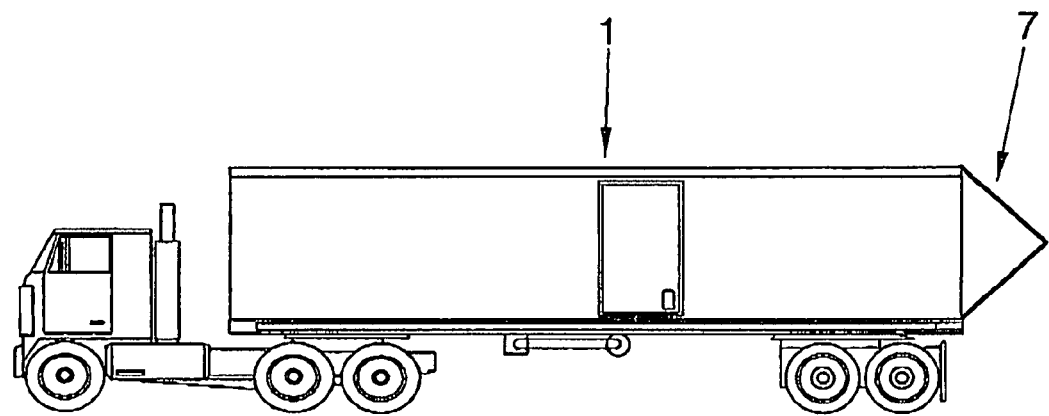

FIGS. 6 and 7 show the assembly of a pyramid (7) in the rear of the vehicle. Regarding this system there are also numerous versions such as reducing the size of the pyramid or even the shape thereof, truncating the pyramid itself, placing only the walls of the truncated pyramid, etc. Each of these systems is fragile and not secure, although the biggest inconvenience is that they are not fixed and they have to be removed in order to open the back doors. Most of these pyramids are built without very strong materials, such as canvas, fabric or even plastics, placed on aluminum, plastic or at times wooden rods.

Figure 8:
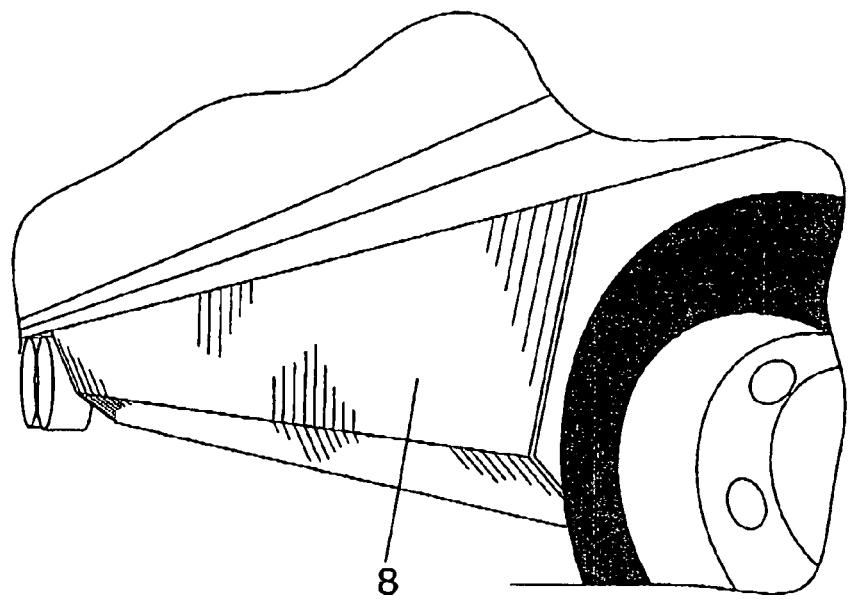
FIG. 8 is a partial and perspective view of another vehicle that includes flaps in its sides for the purpose of reducing aerodynamic resistance.
Figure 9:
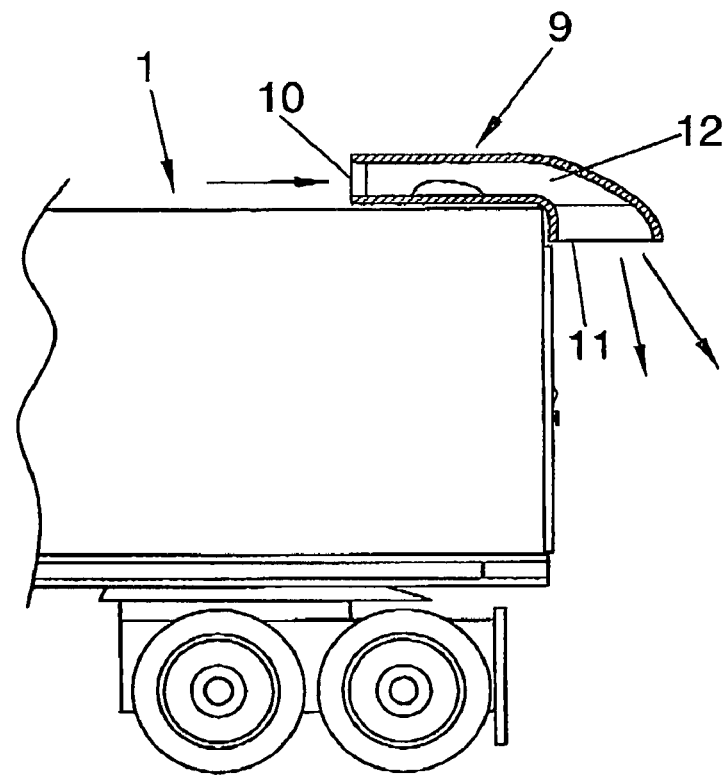
FIGS. 9, 10 and 11 are respective plan, profile and front raised views of the tubular casing that is mounted on the vehicle in a fixed manner, defining a system for reducing the fuel consumption upon reducing aerodynamic resistance caused in the forward movement thereof, according to the invention.
Figure 10:
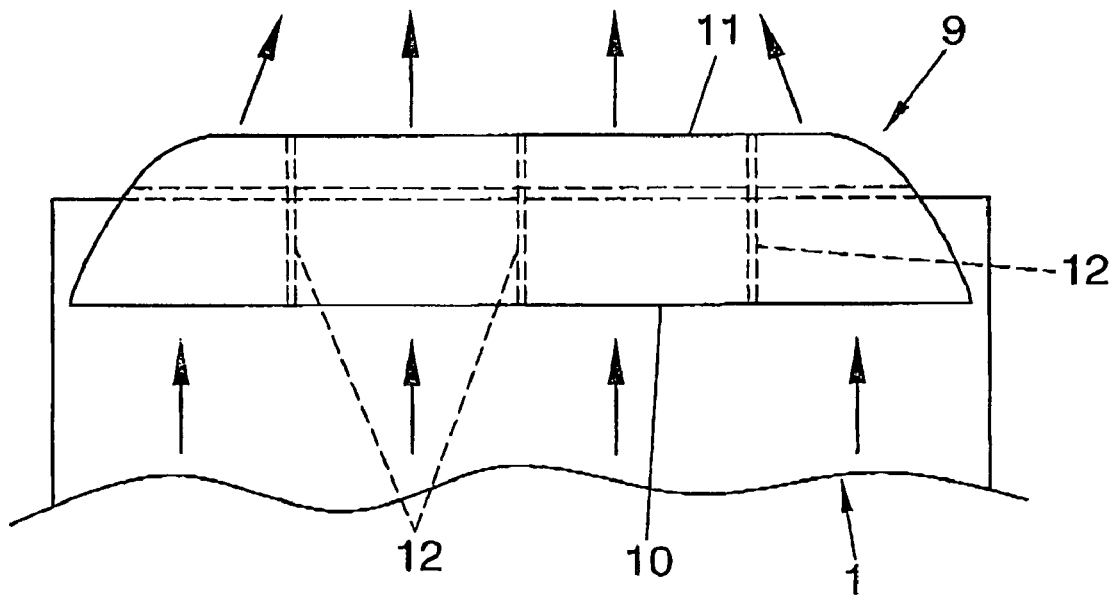
Figure 11:
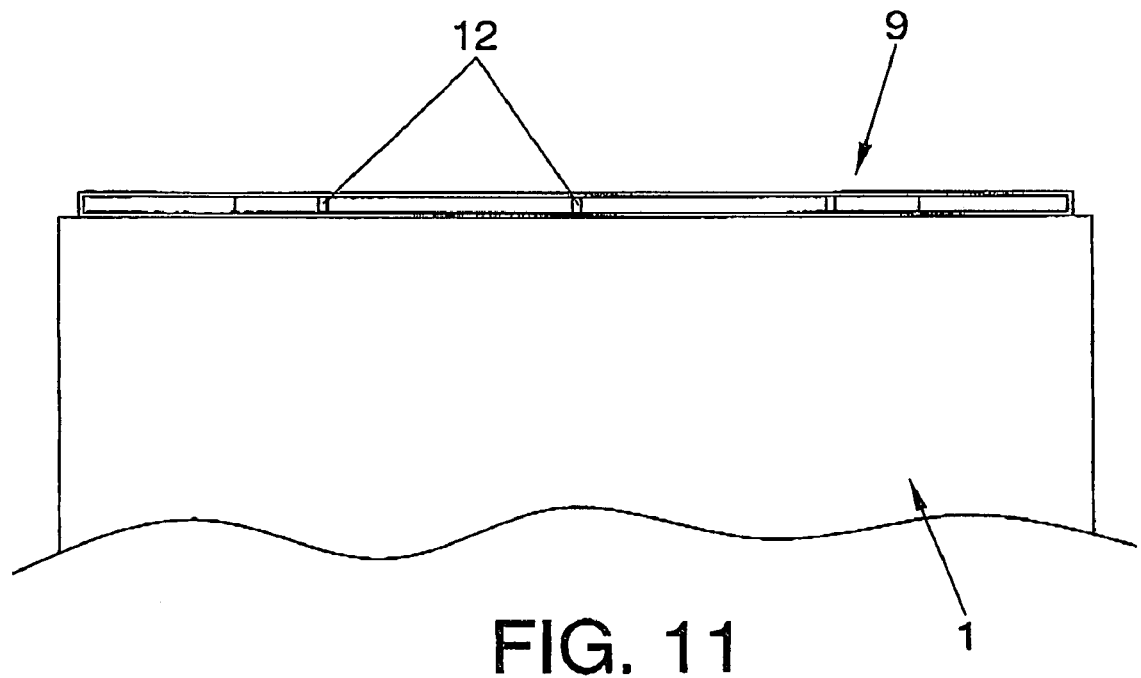

With reference to FIG. 8, we can see a conventional way of mounting some flap type sheets (8) in the sides of the vehicle, cabin or trailer, for the purpose of reducing aerodynamic resistance, but these also have the inconvenience that they are fragile, easily broken and not secure.

The system to reduce fuel consumption in vehicles, according to the present invention, is schematically shown in FIGS. 9 to 12, which includes placing in the rear part of the roof a tubular casing (9) that turns towards the rear front of the vehicle, without reaching the height of the rear doors, with a inlet mouth (10) of air during the forward movement of the vehicle. This air comes out through the rear part of this casing (9) having an outlet that is directed downward, precisely towards the area where the depression (2), shown in FIG. 1, is caused. Reference (11) designates the outlet of the tubular casing (9). The depression itself formed in the rear part of the vehicle acts to suction the air that occupies the top part of the vehicle and that enters through the mouth (10). The side-walls of the tubular casing (9) are curved-convex to more easily channel the entering air and not offering resistance (see FIG. 10).

Figure 12:
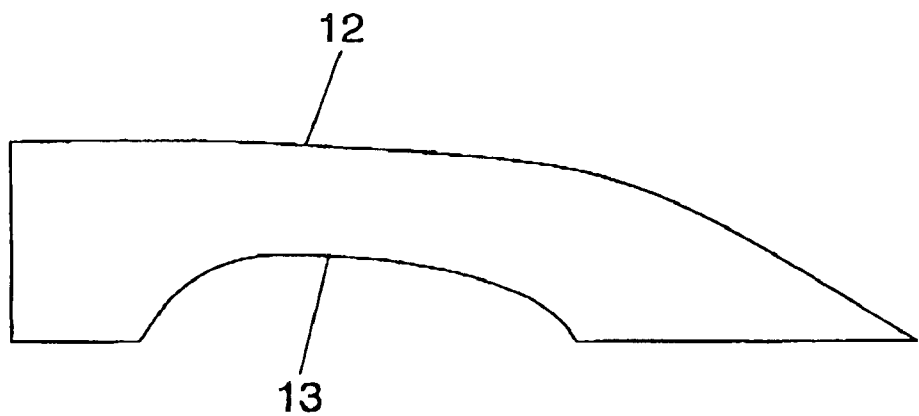
FIG. 12 is a plan view of one of the reinforcement ribs that are included in the tubular casing of FIGS. 9 to 11.

Reference (12) designates rigidization ribs in the horizontal walls of the tubular casing. FIG. 12 illustrates the geometric shape of these reinforcement ribs (12) provided in this preferred embodiment, with openings (13) in the bottom part for the purpose of balancing the pressure of all the tubular casings formed between different ribs.

With this arrangement, the system for reducing the fuel consumption in vehicles that the invention proposes, has the following characteristics:

It is permanently fixed.

It is secure (placed strongly with anchors following current regulations).

Resistant (its materials also comply with the current regulations).

It is a sole robust and efficient piece.

It is not necessary to dismount or mount it in order to open the rear doors.

The system is also effective close to 9% in fuel reduction.

The system is ideal to combine with other systems (in combination a savings of 14%) may be achieved.

The tubular casing (9), upon having a considerable size (around 2.5 meters), precisely needs these reinforcement ribs so that they do not sag. Upon having holes or an opening (13) to ensure the balance of the pressure of the entire inside. Upon the outlet being in the rear and thanks to the depression that is formed behind the vehicle, circulation is not interrupted. This depression phenomenon, draws air from the suction mount (10) of the tubular casing (9) and in turn causes the boundary turbulent layer created on the roof of the body or trailer of the truck to be restrained, in turn reducing the induced resistance and from friction.

It can be considered that the system to reduce fuel consumption that the invention proposed causes the reduction of resistance.

Reduction of the resistance induced by the delay of the turbulent boundary layer on the roof of the cabin or trailer.

Reduction of the area of low pressure in the rear.

Reduction of the turbulence created by the forward movement of the vehicle.

The invention claimed is:

1. A system for reducing fuel consumption in a vehicle by minimizing the aerodynamic resistance caused by forward motion of the vehicle, the system comprising:

a tubular structure configured to be placed on a rear part of a roof of the vehicle and extending around to a top part of a rear part or stern of the vehicle, said tubular structure being configured to provide air to the rear part or stern of the vehicle where a low pressure area is created as a result of the forward motion of the vehicle, said tubular structure including an outlet directed downward and an inlet with a smaller section than said outlet to prevent high pressure, and including a top wall, a bottom wall, and horizontal walls, said top and bottom walls being connected to reinforcement ribs, said reinforcement ribs being vertical plates welded to said horizontal walls and having holes or openings to balance the pressure in tunnels or chambers formed between said reinforcement ribs, wherein said tubular structure is configured to act as a funnel by taking air from a top part of the vehicle during forward motion and channeling and balancing the air from the top part of the vehicle to the low pressure area of the rear part or the stern of the vehicle.

2. A system for reducing fuel consumption in a vehicle according to claim 1, wherein said tubular structure is permanently fixed to the vehicle.

\* \* \* \* \*